United States Patent
Sivakumar et al.

(10) Patent No.: US 11,146,501 B2
(45) Date of Patent: Oct. 12, 2021

(54) DECISION BASED RESOURCE ALLOCATION IN RESPONSE SYSTEMS

(71) Applicant: International Business Machines Corporation, Armonk, NY (US)

(72) Inventors: Gandhi Sivakumar, Bentleigh (AU); Debojyoti Mookerjee, Normanhurst (AU); Salil Ahuja, Victoria (AU); Kiran Challapalli, Hyderabad (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/448,242

(22) Filed: Jun. 21, 2019

(65) Prior Publication Data

US 2020/0403934 A1 Dec. 24, 2020

(51) Int. Cl.
*H04L 12/911* (2013.01)
*H04L 29/08* (2006.01)
*H04L 12/917* (2013.01)
*H04L 12/14* (2006.01)

(52) U.S. Cl.
CPC .......... *H04L 47/782* (2013.01); *H04L 67/306* (2013.01); *H04L 12/14* (2013.01); *H04L 47/76* (2013.01); *H04L 67/22* (2013.01)

(58) Field of Classification Search
CPC ... H04L 47/782; H04L 67/306; H04L 47/788; H04L 67/10; H04L 67/1002; H04L 47/76; H04L 67/22; H04L 12/14; H04L 12/1453; H04M 3/5238; H04M 3/5233; H04M 3/5235; H04M 3/5183; H04M 3/52

See application file for complete search history.

(56) References Cited

U.S. PATENT DOCUMENTS

| | | | |
|---|---|---|---|
| 9,106,749 B2 | 8/2015 | Schultz et al. | |
| 9,552,231 B2 | 1/2017 | McLean | |
| 2006/0026049 A1* | 2/2006 | Joseph | G06Q 10/0635 705/7.28 |
| 2010/0257601 A1 | 10/2010 | Bolyukh et al. | |
| 2011/0137818 A1* | 6/2011 | Goad | G06Q 30/0631 705/347 |
| 2012/0130771 A1 | 5/2012 | Kannan et al. | |
| 2012/0278176 A1 | 11/2012 | Naor et al. | |
| 2013/0346886 A1 | 12/2013 | Cauchois et al. | |
| 2014/0314225 A1* | 10/2014 | Riahi | H04M 3/5183 379/265.09 |

(Continued)

OTHER PUBLICATIONS

Xu et al., "Support calls too long? Shorten response times with a virtual assistant", IT Biz Advisor, Sep. 20, 2018, Sponsored by IBM, 6 pages, https://itbizadvisor.com/2018/09/support-calls-too-long-shorten-response-times-with-a-virtual-assistant/.

*Primary Examiner* — Patrice L Winder
*Assistant Examiner* — Aye M Aung
(74) *Attorney, Agent, or Firm* — Nolan M. Lawrence (57) ABSTRACT

A first user communication request by a first user is detected. The first user communication request is directed to a computer response system. In response to detecting the first user communication request a profile associated with the first user is determined. A first set of computing resources of the computer response system is allocated to a first automated respondent. The allocation is based on the determined profile. A communication between the first user and the first automated responded is assigned based on the determined profile.

20 Claims, 3 Drawing Sheets

(56) References Cited

U.S. PATENT DOCUMENTS

| | | | |
|---|---|---|---|
| 2015/0120660 A1* | 4/2015 | Schreter | G06F 9/546 |
| | | | 707/626 |
| 2016/0128059 A1* | 5/2016 | Hsu | H04W 4/00 |
| | | | 370/336 |
| 2016/0165052 A1* | 6/2016 | Reilly | H04M 3/5238 |
| | | | 379/265.1 |
| 2016/0277315 A1* | 9/2016 | Miller | H04L 67/327 |
| 2016/0342911 A1 | 11/2016 | Kannan et al. | |
| 2017/0116177 A1* | 4/2017 | Walia | G06F 40/35 |
| 2017/0269975 A1* | 9/2017 | Wood | G10L 15/22 |
| 2018/0053119 A1* | 2/2018 | Zeng | G06F 40/295 |
| 2018/0197542 A1* | 7/2018 | Horling | G10L 15/22 |
| 2019/0058712 A1* | 2/2019 | Jones | H04L 63/18 |
| 2019/0058793 A1* | 2/2019 | Konig | H04M 3/5183 |
| 2019/0310888 A1* | 10/2019 | Lessin | G06F 9/505 |

\* cited by examiner

DECISION BASED RESOURCE ALLOCATION IN RESPONSE SYSTEMS

BACKGROUND

The present disclosure relates to computer response systems, and more specifically, to allocating and adjusting resources of computer response systems.

Computer response systems are capable of handling customer requests in an end user environment, such as ordering and purchasing of household goods. Computer response systems may be used in medical context, such as fielding diagnostic and medicine ordering questions. Computer responses systems may be used to field industrial service situation, to answer upgrade and service questions.

SUMMARY

Disclosed are a method, system, and computer program product for reallocating computing resources according to embodiments of the present disclosure. A first user communication request by a first user is detected. The first user communication request is directed to a computer response system. In response to detecting the first user communication request a profile associated with the first user is determined. A first set of computing resources of the computer response system is allocated to a first automated respondent. The allocation is based on the determined profile. A communication between the first user and the first automated respondent is assigned based on the determined profile.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to computer response systems; more particular aspects relate to allocating and adjusting resources of computer response systems. While the present disclosure is not necessarily limited to such applications, various aspects of the disclosure may be appreciated through a discussion of various examples using this context.

Computer response systems (response systems) are becoming more prevalent to perform customer service. For instance, computer response systems may enable a customer service representative (representative) to handle multiple requests. A representative may be able to manage and supervise multiple chat sessions as they are performed by response systems. The representative may be able to step in when more advanced responses are appropriate. In some instances, a response system can operate without a representative, such as during off hours when a representative is taking a break. Response systems may include text-based chat communication system or automated audio communication systems (automated respondents). Automated respondents may operate by communication with a user. For instance, by receiving messages from a user, and by responding based on the received messages.

Receiving of user messages and determining responses to the received messages by a response system may require significant resources of a computer system (computing resources). For instance, the language and conversation structure may take up a significant portion of memory (e.g., gigabytes, terabytes). Moreover, response system may expend many processing cycles to determine responses (e.g., from a central processing unit, from a language processor, from an accelerator).

As users become accustomed to using response systems to speak to computers, adoption greatly increases. Response systems only have limited computing resources and expanding computing resources may be costly. Consequently, as the number of users increases, additional computing resources are needed to handle an increased number of automated respondents. In some instances, with additional adoption, users with more diverse requests may begin to use response systems. The users may, in some instances, not be communicating with the response system to further a customer situation (e.g., asking irrelevant questions, asking for support for a product that is out of warranty, asking for support related to a product from another company or unrelated to the response system). In some instances, response systems may lead to misuse by nefarious or bad actors. Bad actors may try to spam response systems to deny legitimate requests from legitimate users or to create other outages.

To address the computing resource limitations, allocating different amounts of resources to communications provides technological advantages for response systems. Allocation of differing amounts of resources may occur before a communication session is initiated. For example, a response system may associate a user with a profile and allocate and assign resources of the response system based on the profile. Allocation of differing amounts of resources may occur during the communication session. For example, a response system may monitor communication between the user and the automated respondent and may adjust resources of the response system based on the intent identified from the conversation. By allocating differing amounts of resources in a response system, computing resources may be more efficiently used. For example, by reducing the amount of processing allocated to a plurality of chat sessions, additional chat sessions may be hosted on the same computer. Consequently, the response system may be able to process additional sessions with no loss in effectiveness perceptible by end users. In another example, a response system may reduce the number of queued communication sessions that are waiting to be served by reducing the memory of each automated respondent. Responsively, each end user may only notice a reduced wait time, but not realize that the response system is tailoring each communication session based on estimated cost of responding to each user.

Figure 1:
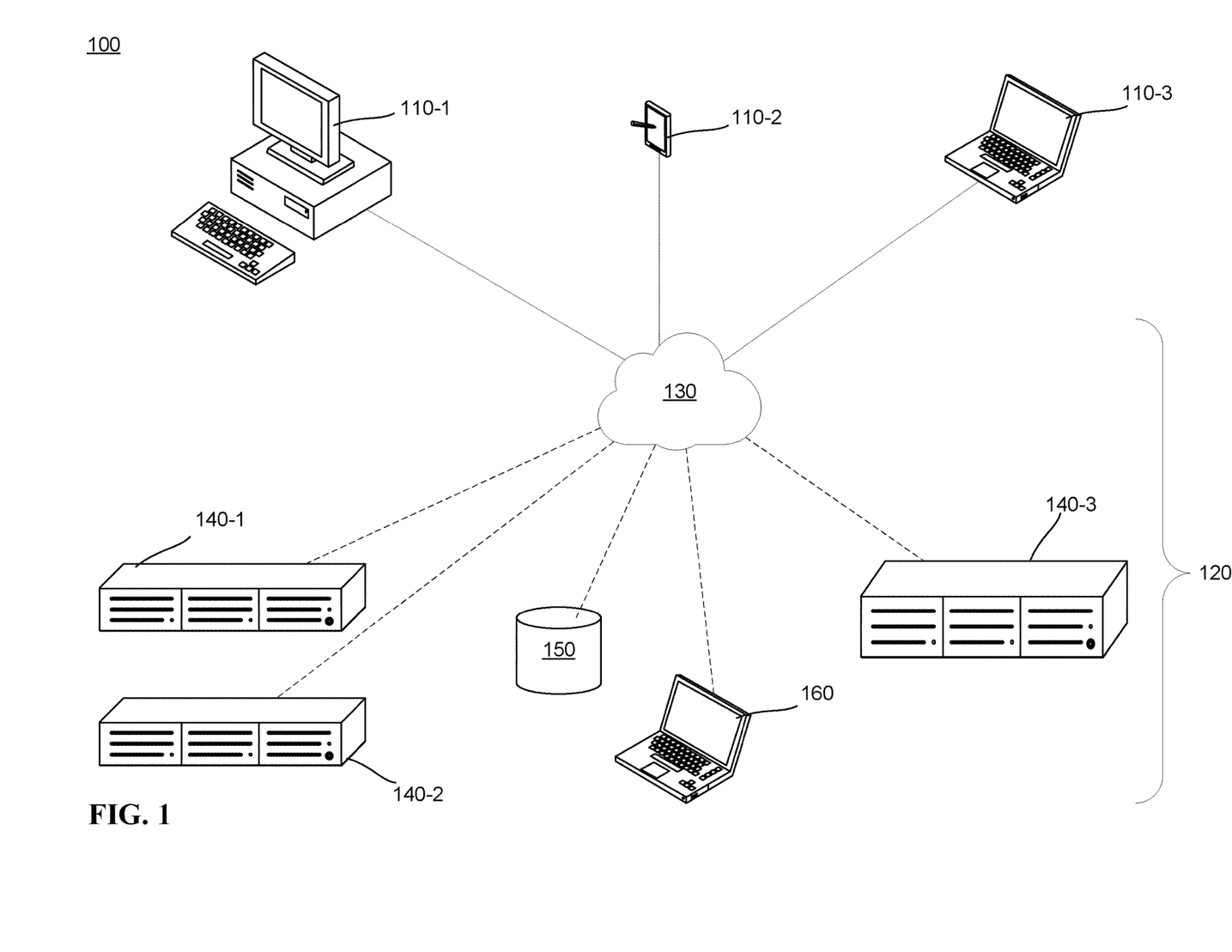
FIG. 1 depicts a system configured to respond to user requests, consistent with some embodiments of the disclosure.

FIG. 1 depicts a system 100 configured to respond to user requests, consistent with some embodiments of the disclosure. System 100 includes the following: one or more clients 110-1, 110-2, and 110-3 (collectively, 110); and a response system 120. The clients 110 may be computing clients (e.g., smartphones, personal computers) used by users (not depicted) to perform computing tasks. The clients 110 may be configured to accept requests by users to communicate with a representative (e.g., a person or company that may answer questions related to products or services). The clients 110 may transmit the accepted requests to a network (e.g., the Internet). For exemplary purposes, depicted are three clients 110, though other clients may be utilized in system 100.

The response system 120 includes the following: a network 130 for communicatively coupling components and to send and receive messages; one or more servers 140-1, 140-2, and 140-3 (collectively, 140) for processing requests; a datastore 150 for recording of information; and an administrative client 160. The network 130 may be a local or wide area network communicatively couple to the Internet and connecting the servers 140 together. The network 130 may also communicatively couple the servers 140 to the datastore 150. The network 130 may communicatively couple the server 140 to the clients 110 and facilitate communication. For example, client 110-3 may type a message to a web-based text client and send the message to the Internet. From the internet, network 130 may forward the conversation to the servers 140 for determining responses. The network 130 may also communicatively couple the administrative client 160 to the rest of the response system 120.

Figure 3:
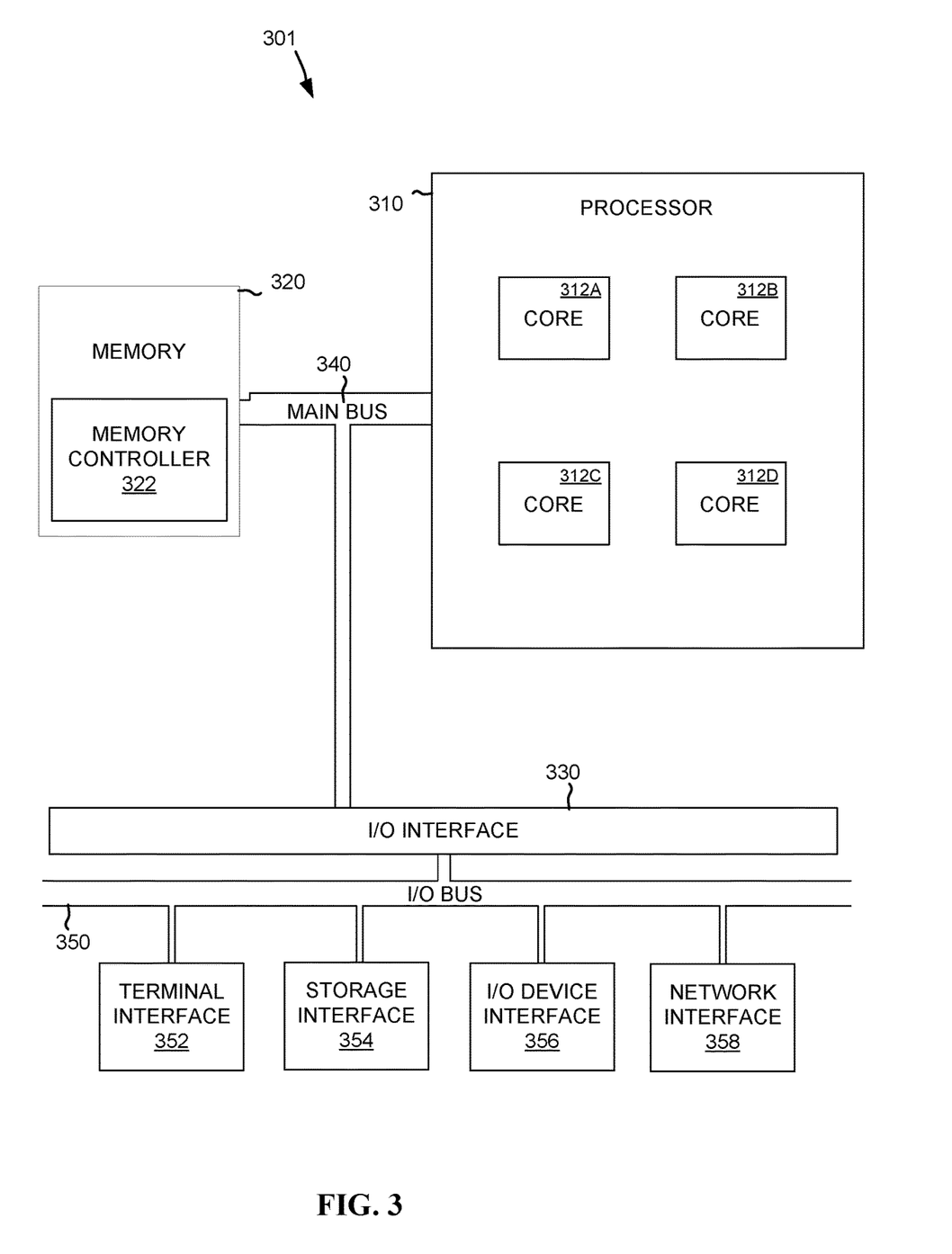
FIG. 3 depicts the representative major components of an example computer system that may be used, in accordance with some embodiments of the present disclosure.

Servers 140 may respond to and determine the cost of responding and handling communication sessions with users. Servers 140 may be computing systems having memory, processing, and input/output (I/O) resources. An example computer system consistent with some embodiments is depicted in FIG. 3. Servers 140 may be located together or at separate geographic locations. In a first example, server 140-3 is located on site or in the same geographic location as one or more of the clients 110. In a second example, servers 140-1 and 140-2 are located at a geographically separate location from any of the clients 110. The servers 140 may be considered local servers or cloud servers and may have the ability to transfer automated respondent sessions between each other. In a first example, a communication session (communication) begins on a remote cloud server 140-2 and is transferred to a local server 140-3. Servers 140 may have different configured computing resources. In a first example, server 140-3 has multiple dozen-core microprocessors and hundreds of gigabytes of memory. Server 140-3 may operate by running an instance of an automated respondent administration program and hundreds of automated respondents. In a second example, server 140-2 has a single quad-core microprocessor and tens of gigabytes of memory and server 140-1 has a similar configuration. Server 140-2 may operate by running an instance of an automated respondent administrative program and server 140-1 may operate by running dozens of automated respondents.

Servers 140 may allocate and reallocate computer resources (e.g., memory, processing, and I/O) based on determining the type of user that is requesting communication. Servers 140 may retrieve a profile related to a user from the datastore 150 to categorize the type of user. The profile may contain one or more items related to a user (e.g., username, password, internet protocol address, type of products or services owned by the user, promptness of payment of the user, number of previous service requests initiated by the user, level of any paid customer service agreement). The profile may contain the previous communication or previous intent of the user (e.g., the previous intent to purchase products, the previous intent to return a product, the likelihood to cancel a service).

Servers 140 may allocate and reallocate computer resources based on the intent of the user. The intent may be determined directly from the user (e.g., the user selecting a repair request from a dropdown before the communication starts). The intent may be determined during communication with the user. Servers 140 may determine the intent during communication by executing a probabilistic engine. The probabilistic engine may be software, hardware, or some combination thereof, designed to identify a trend of a user including previous communication of a user. For example, the probabilistic engine may be a part of the response system 120 that stores information in datastore 150 regarding previous users, including speech patterns or text responses, and associated outcomes of users that use such patterns or responses. The servers 140 may run the probabilistic engine to identify the possibility that the end user may become a prospect customer. The servers 140 may run the probabilistic engine to identify the possibility that the end user may cancel a service or return a product. The servers 140 may run the probabilistic engine to identify the possibility that the end user is a bad actor (e.g., a connection used to waste resources of the response system 120).

Allocation and reallocation of resources may include allocation of a memory of a given server 140. For example, server 140-1 may include ten gigabytes of dynamic random-access memory (DRAM) and 200 megabytes of level three cache memory (cache). The DRAM may operate at a first speed and the cache may operate at a second speed that is fifty times faster than the first speed of the DRAM. Server 140 may initially allocate ten percent of the DRAM and five percent of the cache to a first automated respondent charged with responding to a first user. During the communication, the first automated respondent may be reassigned a lesser amount of memory to utilize only nine percent of the DRAM but seven percent of the cache of server 140. In some embodiments, allocation of a memory may include increasing or decreasing the total amount of available memory to an automated respondent responsible for communication with a given user. For example, assigning a larger share of the DRAM or assigning a smaller amount of the cache.

Allocation and reallocation of resources may include allocation of a processing power (processing) of a given server 140. For example, a given server 140 may include a generalized central processing unit (CPU) and a dedicated processing unit (DPU). The CPU may be in charge of performing tasks related to processing incoming communication requests and the DPU may be an application specific integrated circuit designed to perform natural language processing. Allocating may include initially assigning processing of an automated respondent to the DPU and, at a later time, transferring processing to the CPU. Allocating of processing of a given server 140 may include allocating a frequency of processing time, such as the delay, response time, pause, or increased wait time of a thread. For example, a processor may be able to handle dozens of automated respondents every second, with each automated respondent receiving a slice of processor time every 200 milliseconds.

Reallocating of processing may include changing the processor time allocated to an automated respondent to every 600 milliseconds.

Allocation and reallocation of resources may include allocation of I/O resources of a given server 140. For example, a given server 140 may have a set of one or more I/O adapters for communicatively coupling to network 130. Each I/O adapter may have the bandwidth to handle fifty clients in real time and address (e.g., assign a network ID) but delay handling of 2,000 total communication sessions. Reallocation of resources may include reducing the response time from 1,500 milliseconds to 600 milliseconds for a given automated respondent. In some embodiments, reallocation of I/O resources of the response system 120, may include reassigning a communication session between the plurality of servers 140. For example, server 140-3 may be assigned to allocate computing resources to a first automated respondent for communication with a first user. During communication, it may be determined that server 140-3 may be too costly to operate because the computing resources of server 140-3 are needed for other operations. Consequently, a second automated respondent may be instantiated on server 140-2 and the communication session of the first user may be transferred to the second automated respondent. In some embodiments, a first automated respondent may be transferred (e.g., the program and its working memory) to another server.

In some embodiments, the response system 120 may be configured to reallocate computing resources periodically. For example, server 140-3 may have been reassigned to perform communication of a first automated respondent after the first automated respondent was initially executing on server 140-2, because the response system 120 determined the value of the user was a high value. During the communication, the response system 120 may determine that the value of the user is no longer a high value—because the user's question was answered, and the user has started asking irrelevant questions. In response to identifying the updated value of the customer, the automated response system 120 may reallocate the first automated respondent to server 140-2 and may reduce the processing power assigned to the first automated respondent.

In some embodiments, the response system 120 may be configured to communicate status to an administrative user. For example, each automated respondent executing on a given server 140 may include a respondent graphical user interface (GUI) (not depicted) on administrative client 160. A first automated respondent may include a first respondent GUI that includes a series of messages including the history of conversations conducted by the first automated respondent. An administrative user may take over for the first respondent by using a chat window of the first respondent GUI to directly respond to a user. The response system 120 may also display a cost GUI (not depicted) that informs the administrative user about the cost of the communication session of the first automated respondent. The cost GUI may communicate the cost of the communication session based on the allocated resources visually to the administrative user. The cost GUI may represent the cost by color (e.g., green color for low cost, yellow color for medium cost, and red color for high cost or potential bad actor).

In some embodiments, the cost GUI and the first respondent GUI may be incorporated into the same window of a desktop operating system GUI (not depicted). For example, a chat window that includes rankings or values of the automated communication session along with an area for typing responses displayed on administrative client 160. In some embodiments, the cost GUI may list or rank all automated respondents currently in operation. For example, a single window of GUI displayed on administrative client 160 may map or display all the concurrent automated respondents operating on response system 120. The single window may utilize list sorting or pie-chart visualizations to represent the computing resource costs of each automated responses operating on response system 120.

In some embodiments, a cost GUI may alert or notify an administrative user of a high cost automated respondent. For example, a cost GUI may flash a window repeatedly, or response system 120 may cause administrative client 160 to make a chirp or audible noise. In some embodiments, a cost GUI may provide a time-based cost valuation to an administrative user. For example, allocation and reallocation of resources in response system 120 may be based on a fixed time per user. Low cost users may be assigned fifteen minutes of computing resources. Medium cost users may be assigned seven minutes of computing resources. High cost users may be assigned two minutes of computing resources. A cost GUI on administrative client 160 may display a timer that counts downward and displays the number of minutes left for a given automated respondent to perform communication with a user based on the cost.

Figure 2:
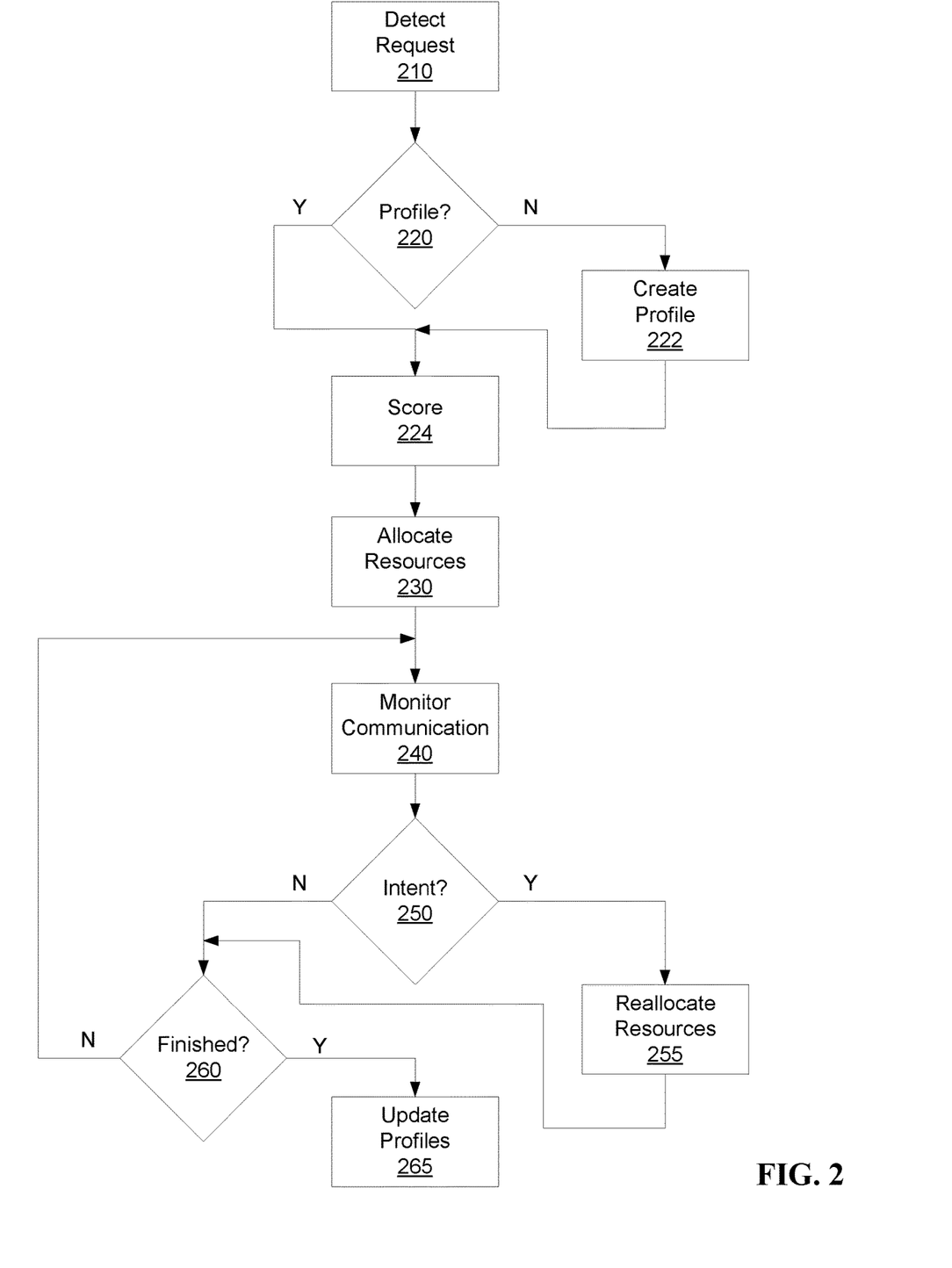
FIG. 2 depicts a method of allocating of computing resources, consistent with some embodiments of the disclosure.

FIG. 2 depicts a method 200 of allocating of computing resources, consistent with some embodiments of the disclosure. Method 200 may be performed by a single server designated to execute automated respondents. FIG. 3 depicts an example computer system capable of performing method 200. Method 200 may be performed across a plurality of servers. Multiple instances of method 200 may be executed simultaneously (e.g., an instance of method 200 for each automated respondent). In some embodiments, operations of method 200 may be separated or combined. Method 200 may operate continuously (e.g., every few seconds, every 100 milliseconds).

Method 200 begins by detecting a communication request at 210. The communication request may be from a client device—and a user associated with the client device—across a network (e.g., the Internet). The communication request may include identifying details (e.g., an IP address of the client device, a username and password, a name of the user, an account number). The communication request may be a first user communication request. At 220 it is determined if there is a profile of the user. If there is a not a profile, at 220, a profile may be created at 222. The profile may be created, at 222, based on the supplied identifying details. The identifying details may include any one or more of the following: the type of customer; the intent of the customer; if the customer is an existing customer; if the customer is a new customer; the complexity of the initial inquiry, question, and/or request; the previous questions of the users.

If there is a profile at 220 (or after a profile is created at 222), the communication request may be scored at 224. The scoring at 224 may be performed by a computing device or other scoring engine. The scoring at 224 may assign a value to the communication request, detected at 210. The scoring at 224 may assign a value to the profile. Scoring at 224 may include weighting or valuing the content of the conversation. For example, scoring at 224 may include determining the type of product inquiry or service included in the communication or in the request. The scoring at 224 may assign a value based on the profile of the customer. For example, scoring at 224 may include assigning more weight based on the customers location and age range.

The scoring at 224 may assign a value based on the purchase history. For example, a communication request may come from a party that has previously purchased thirty laptop computers. The scoring may include rating or valuing the request proportionally higher for each laptop that was previously purchased. The scoring at 224 may be based on a recurring payment of a party related to the profile or the request. For example, a user has an existing service level agreement that includes expectation related to uptime or availability of servers purchased by the user. Based on the service level agreement the scoring may rate the request as higher value. The scoring, at 224, may be based on resources of the party hosting the communication session. For example, scoring may be based on current marketing strategy, inventory levels, incentives, supplier contracts, or shipping discounts.

After scoring, at 224, resources may be allocated at 230. Allocation of resources, at 230, may include assigning computing resources based on memory, processing, or I/O. Allocation of resources, at 230, may include assigning computing resources at a specific location. Allocation of resources, at 230, may include assigning private resources, such as a server that is localized to any client that sent in the request. Allocation of resources, at 230, may include assigning private resources based on cost of conducting communication of an automated respondent, such as a company associated with the client or a user of the client that sent in the request, any company associated with a client. Allocation at 230, may be based on the profile of the user. For example, the intent, or type of a user, detected at 220. Allocation at 230, may include assigning resources based on the scoring, at 224. Allocation at 230, may include instantiating a new automated respondent to communicate with the user that requested communication. Allocation at 230, may include assigning the instantiated automated respondent to perform communication. In some embodiments, allocation at 230, may include reassigning an existing automated respondent to perform communication.

Communication with a user may be monitored at 240. Monitoring of communication, at 240, may include performing language analysis, entity identification, pattern matching, or other relevant processing to identify the intent of a user. Based on the monitoring, at 240, an intent of the user in communication with an automated respondent may be identified at 250. Intent may be identified at 250 based on a combination of the details of the communication, monitored at 240, and based on the profile, determined at 220. For example, a spoken phrase during communication between a user and an automated respondent intent may be identified by matching a serial number of a device in the communication with a product in a company database. Additionally, a service level agreement of the user in the conversation may be identified based on the profile of the user. Identifying the intent, at 250 may include any one or more of the following: the intent of the customer; if the customer is an existing customer; if the customer is a new customer; the complexity of the initial inquiry, question, and/or request; the previous questions of the users; previous questions of other users.

If intent of the user is identified, at 250, resources may be reallocated at 255. Reallocation of resources, at 255, may include allocating a new set of memory, processor, or I/O. Reallocation of resources, at 255, may include transferring communication to a different automated respondent, such as a second automated respondent located on a private server. Reallocation of resources, at 255, may include transferring the automated respondent to a different server and permitting the transferred automated respondent to continue communication. Reallocation of resources, at 255, may include no longer allocating resources to an automated respondent. In a first example, zero resources may be allocated to a communication session after the communication session has lasted a fixed amount of time. In a second example, no longer allocating resources includes sending a message to the user that states "I'm glad I could help you today. If you have any new questions, contact us again" and disconnecting from the client. In a third example, no longer allocating resources includes setting processing resources to zero by forwarding control of the conversation to an administrative user.

Reallocation or resources, at 255, may be based on comparing the cost of the user to previous conversations of the same user. Reallocation or resources, at 255, may be based on comparing the cost of the user to previous conversations of other user, such as identifying that a particular intent is a significant cost. Reallocation of resources, at 255, may be based on comparing the cost of the user to any current users communicating with other automated respondents and ranking the priority of the user relative to all current users. For example, based on the intent and profile of a first user, a cost of seven on a scale of one (low cost of computing resources) to ten (high cost of computing resources) may be identified. A second user may be ranked five based on the intent and profile of the second user in communication with a second automated respondent. A third user may be ranked as four based on the intent and profile of the second user in communication with the third automated respondent. Based on the ranking, reallocation of resources, at 255, may include allocating some of the memory space used by the first automated respondent to the second automated respondent. Based on the ranking, reallocation of resources, at 255, may include allocating most of the processing cycles used by the first automated respondent to the third automated respondent.

If the intent is not identified at 250 (or after reallocation of resources at 255), it may be determined that communication is finished with an automated respondent at 250. Communication may be finished, at 260, if a user has received a satisfactory response from communication with an automated respondent. Communication may be finished, at 260, when resources are no longer allocated to an automated respondent assigned to communicate with the user, at 255. If communication is not finished, at 260, method 200 continues to resume monitoring of communication, at 240, to try and reidentify intent at 250. Again, if a new intent of a user is identified, at 250, the amount of resources may change, based on reallocation of resources at 255.

If communication is finished, at 260, profiles of the response system may be updated at 265. Updating of profiles, at 265, may include updating a profile related to a user that just finished communication. In a first example, updating the profile of a given user, at 265, includes recording in the profile of the user that a purchase was made. In a second example, updating the profile of a given user, at 265, includes recording in the profile of the user that the communication involved a low amount of computing resources. Updating of profiles, at 265, may include updating a profile related to a common datastore. The common datastore may include previous conversations, conversation snippets, and identified entities. The common datastore may include related responses and likelihood of success of the related responses. By updating the common datastore reduced processing of future conversations may be realized (e.g., reducing the number of responses, reducing the processing overhead). After profiles are updated, at 265, method 200 ends.

FIG. 3 depicts the representative major components of an example computer system 301 that may be used, in accordance with some embodiments of the present disclosure. It is appreciated that individual components may vary in complexity, number, type, and\or configuration. The particular examples disclosed are for example purposes only and are not necessarily the only such variations. The computer system 301 may comprise a processor 310, memory 320, an input/output interface (herein I/O or I/O interface) 330, and a main bus 340. The main bus 340 may provide communication pathways for the other components of the computer system 301. In some embodiments, the main bus 340 may connect to other components such as a specialized digital signal processor (not depicted).

The processor 310 of the computer system 301 may be comprised of one or more cores 312A, 312B, 312C, 312D (collectively 312). The processor 310 may additionally include one or more memory buffers or caches (not depicted) that provide temporary storage of instructions and data for the cores 312. The cores 312 may perform instructions on input provided from the caches or from the memory 320 and output the result to caches or the memory. The cores 312 may be comprised of one or more circuits configured to perform one or more methods consistent with embodiments of the present disclosure. In some embodiments, the computer system 301 may contain multiple processors 310. In some embodiments, the computer system 301 may be a single processor 310 with a singular core 312.

The memory 320 of the computer system 301 may include a memory controller 322. In some embodiments, the memory 320 may comprise a random-access semiconductor memory, storage device, or storage medium (either volatile or non-volatile) for storing data and programs. In some embodiments, the memory may be in the form of modules (e.g., dual in-line memory modules). The memory controller 322 may communicate with the processor 310, facilitating storage and retrieval of information in the memory 320. The memory controller 322 may communicate with the I/O interface 330, facilitating storage and retrieval of input or output in the memory 320.

The I/O interface 330 may comprise an I/O bus 350, a terminal interface 352, a storage interface 354, an I/O device interface 356, and a network interface 358. The I/O interface 330 may connect the main bus 340 to the I/O bus 350. The I/O interface 330 may direct instructions and data from the processor 310 and memory 320 to the various interfaces of the I/O bus 350. The I/O interface 330 may also direct instructions and data from the various interfaces of the I/O bus 350 to the processor 310 and memory 320. The various interfaces may include the terminal interface 352, the storage interface 354, the I/O device interface 356, and the network interface 358. In some embodiments, the various interfaces may include a subset of the aforementioned interfaces (e.g., an embedded computer system in an industrial application may not include the terminal interface 352 and the storage interface 354).

Logic modules throughout the computer system 301— including but not limited to the memory 320, the processor 310, and the I/O interface 330—may communicate failures and changes to one or more components to a hypervisor or operating system (not depicted). The hypervisor or the operating system may allocate the various resources available in the computer system 301 and track the location of data in memory 320 and of processes assigned to various cores 312. In embodiments that combine or rearrange elements, aspects and capabilities of the logic modules may be combined or redistributed. These variations would be apparent to one skilled in the art.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A method of reallocating computing resources comprising:
   detecting a first user communication request by a first user, the first user communication request directed to a computer response system;
   determining, in response to detecting the first user communication request, a profile associated with the first user;
   allocating, based on the determining the profile, a first set of computing resources of the computer response system to a first automated respondent,
   wherein the first set of computing resources including an amount of computing resources based on the profile that are different from other amounts of computing resources that are assigned to other automated respondents of a plurality of automated respondents,
   and wherein the first set of computing resources is allocated to the first automated respondent before the first user is assigned communication with any automated respondent of the plurality of automated respondents;
   assigning, based on determining the profile, a communication between the first user and the first automated respondent;
   providing a graphical user interface to an administrative user based on the first user, wherein the graphical user interface includes colors that represent a cost of the communication and wherein the graphical user interface may notify the administrative user of the cost of the communication; and
   providing a second graphical user interface to the administrative user based on the first user, wherein the second graphical user interface includes a representation of the communication between the first user and the first automated respondent, and wherein the graphical user interface includes an interface element to permit the administrative user to communicate with the first user.

2. The method of claim 1, wherein the method further comprises:
   monitoring the communication between the first automated respondent and the first user;
   identifying, based on the monitoring the communication between the first automated respondent and the first user, an intent of the first user; and
   allocating, based on the identifying the intent of the first user, a second set of computing resources to the first automated respondent.

3. The method of claim 2, wherein the first set of computing resources includes a first response time of the first automated respondent, and wherein allocating the second set of computing resources includes a second response time of the first automated respondent that is longer than the first response time.

4. The method of claim 2, wherein the first set of computing resources includes a first amount of memory allocated to the first automated respondent, and wherein allocating the second set of computing resources includes allocating a second amount of memory to the first automated respondent that is larger than the first amount of memory.

5. The method of claim 2, wherein allocating a second set of computing resources to the first automated respondent comprises increasing a number of processing cycles allocated to the first automated respondent.

6. The method of claim 2, wherein the computer response system includes a plurality of servers, and wherein allocating the first set of computing resources of the computer response system to a first automated respondent comprises assigning a first server of the plurality of servers to the first automated respondent, and wherein allocating a second set of computing resources to the first automated respondent comprises transferring the communication to a second automated respondent executing on a second server of the plurality of servers.

7. The method of claim 2, wherein identifying an intent of the first user comprises determining the first user is a bad actor.

8. The method of claim 7, wherein the allocating a second set of computing resources to the first automated respondent comprises allocating zero resources to the first automated respondent.

9. The method of claim 1, wherein the allocating the first set of computing resources further comprises:
ranking, based on the determining the profile, the priority of the first user.

10. The method of claim 9, wherein the ranking is relative to a set of one or more other users of the computer response system, each of the one or more other users having a ranked priority.

11. The method of claim 1, wherein the allocating the first set of computing resources of the computer response system to a first automated respondent comprises comparing the profile of the first user to previous communication performed by the computer response system.

12. A system for reallocating computing resources, the system comprising:
a memory; and
a processor, the processor communicatively coupled to the memory, the processor configured to:
detect a first user communication request by a first user, the first user communication request directed to a computer response system;
determine, in response to detecting the first user communication request, a profile associated with the first user;
allocate, based on the determining the profile, a first set of computing resources of the computer response system to a first automated respondent of a plurality of automated respondents,
wherein the allocating of the first set of computing resources is performed before the first user is assigned communication with any automated respondent of the plurality of automated respondents;
assign, based on determining the profile, a communication between the first user and the first automated respondent;
provide a graphical user interface to an administrative user based on the first user, wherein the graphical user interface includes colors that represent a cost of the communication and wherein the graphical user interface may notify the administrative user of the cost of the communication; and
provide a second graphical user interface to the administrative user based on the first user, wherein the second graphical user interface includes a representation of the communication between the first user and the first automated respondent, and wherein the graphical user interface includes an interface element to permit the administrative user to communicate with the first user.

13. The system of claim 12, wherein the processor is further configured to:
monitoring the communication between the first automated respondent and the first user;
identify, based on the monitoring the communication between the first automated respondent and the first user, an intent of the first user; and
allocate, based on the identifying the intent of the first user, a second set of computing resources to the first automated respondent.

14. The system of claim 13, wherein the first set of computing resources includes a first response time of the first automated respondent, and wherein allocating the second set of computing resources includes a second response time of the first automated respondent that is longer than the first response time.

15. The system of claim 13, wherein the first set of computing resources includes a first amount of memory allocated to the first automated respondent, and wherein allocating the second set of computing resources includes allocating a second amount of memory to the first automated respondent that is larger than the first amount of memory.

16. The system of claim 13, wherein allocating a second set of computing resources to the first automated respondent comprises increasing a number of processing cycles allocated to the first automated respondent.

17. A computer program product for reallocating computing resources, the computer program product comprising a computer readable storage medium having program instructions embodied therewith, the program instructions configure to:
detect a first user communication request by a first user, the first user communication request directed to a computer response system;
determine, in response to detecting the first user communication request, a profile associated with the first user;
allocate, based on the determining the profile, a first set of computing resources of the computer response system to a first automated respondent,
wherein the first set of computing resources includes a first amount of computing resources that are based on a profile of the user, and
wherein the first amount of computing resources are different from other amounts of computing resources that are assigned to other automated respondents of a plurality of automated respondents;
assign, based on determining the profile, a communication between the first user and the first automated respondent;
provide a graphical user interface to an administrative user based on the first user, wherein the graphical user interface includes colors that represent a cost of the communication and wherein the graphical user interface may notify the administrative user of the cost of the communication; and
provide a second graphical user interface to the administrative user based on the first user, wherein the second graphical user interface includes a representation of the communication between the first user and the first automated respondent, and wherein the graphical user interface includes an interface element to permit the administrative user to communicate with the first user.

18. The computer program product of claim 17, wherein the allocating the first set of computing resources further comprises:
  ranking, based on the determining the profile, the priority of the first user.

19. The computer program product of claim 18, wherein the ranking is relative to a set of one or more other users of the computer response system, each of the one or more other users having a ranked priority.

20. The computer program product of claim 17, wherein the allocating the first set of computing resources of the computer response system to a first automated respondent comprises comparing the profile of the first user to previous communication performed by the computer response system.

* * * * *